Patented Mar. 21, 1933

1,902,068

UNITED STATES PATENT OFFICE

WILHELM THEODOR GEIS, OF KNAPSACK NEAR COLOGNE-ON-THE-RHINE, GERMANY, ASSIGNOR TO AKTIENGESELLSCHAFT FÜR STICKSTOFFDÜNGER, OF COLOGNE-ON-THE-RHINE, GERMANY, A CORPORATION

HIGHLY ACTIVE CARBON AND PROCESS OF PREPARING IT

No Drawing. Application filed November 20, 1928, Serial No. 320,749, and in Germany November 26, 1927.

The present invention relates to a process of preparing highly active carbon.

It is a known fact that ashes left in the combustion of brown-coal (lignite), ordinary coal, wood or peat, contain a certain amount of active carbon. However, the degree of the activity of these materials varies considerably. For instance the carbon contained in the ashes left on the grate can scarcely be regarded as being active owing to the fact that it has not been heated to a sufficiently high degree. On the other hand the carbon contained in the ashes carried into the flue always possesses active properties.

I have now found that from ashes, particularly from ashes carried into the flue, a carbon of a high adsorbing power and catalytic action can be obtained in an extremely simple manner by sifting them by means of a blast or a sieve and intensely purifying the carbon thus obtained in the usual manner.

Instead of sifting the residues left in the combustion of the said materials by means of a blast or a sieve, they may also be elutriated. In certain cases it may also be advantageous to effect the separation of the several active particles of the carbon according to their grain-sizes and specific gravities by a combined elutriating and sifting operation, in order to obtain in a most perfect manner the enrichment of the active fractions of the materials.

The fractions obtained in the foregoing manner consist of products which, as compared with the unsifted ashes, can be worked up in a much simpler and more economic way. Moreover the products sifted by the above described means are far more active as regards their adsorptive power than those obtainable from non-sifted ashes.

A further advantage of my new method lies in the fact that it renders it possible to obtain a product of very uniform activity.

If the ashes from the above mentioned materials are worked up without being previously sifted, there are obtained adsorptive factors, which are far different from those of the several fractions obtainable from the same ashes which have previously been sifted or otherwise treated. For the several particles of the carbon of various grain-sizes as they are separated by the fractionating-process, differ greatly from each other as regards their adsorptive power. Thus, as will be seen from the following table, the carbon particles which have been isolated by fractionation and are of different grain-size, show the following figures:

Carbon on sieve of 3 mm. mesh isoadsorptive factor against indigo_____ 4.31
Carbon on sieve of 2 mm. mesh isoadsorptive factor against indigo_____ 4.28
Carbon on sieve of 1 mm. mesh isoadsorptive factor against indigo_____ 4.24
Carbon on sieve of ½ mm. mesh isoadsorptive factor against indigo_____ 2.76
Passage through a sieve of ¼ mm. mesh_____ 2.48

The several fractions of the materials also differ greatly from each other as regards their weight by volume and the heat evolved on moistening with water, a fact which further proves the differences in the activity which the several fractions possess. For, the weight by volume (that is to say the apparent specific weight) of the fraction diminishes in the same proportion as their activity increases while the heat evolved on moistening with water becomes higher. The following table shows the respective figures:

| Weight by volume after shaking, in grams per c. c. | Heat of absorption of water in calories |
|---|---|
| On sieve 3 0.257 on sieve 3 mm. mesh | 10.5 |
| On sieve 2 0.209 on sieve 2 mm. mesh | 11.1 |
| On sieve 1 0.192 on sieve 1 mm. mesh | 11.4 |
| On sieve ½, 0.186 on sieve ½ mm. mesh | 12.3 |

Passage through sieve ½=0.161 grams per c. c., passage through sieve ¼=13.6 calories.

If the carbon had not been sifted the very good figures found for the two last mentioned grain-sizes would be compensated by the first three unsatisfactory figures whereby the adsorptive power and the catalytic action of the carbon, taken as a whole, would be greatly diminished. Therefore it is indispensible to separate the various kinds of the materials. Only by sifting the several gas-activated carbons is it possible to obtain a homogeneous active coal suitable for adsorptive and catalytic purposes. Moreover by the new working method fore, considerable economical advantages are realized. For instance the consumption of hydrochloric acid is reduced by one half, as compared with the quantity required in case the carbon is prepared without previously subjecting it to a sifting or sorting operation. A further advantage of the new working method is that it requires a much simpler plant than that necessitated by the older methods.

In the foregoing description of the new process and in the following claims the combustion-residues from coal, wood, peat and any other solid combustibles, are to be regarded as equivalents, just as are equivalent the operations of sorting the materials by means of a sieve or a blast or by elutriation.

I claim:

1. As a highly active carbon product the carbon particles having been separated from the ashes of lignite, particularly from the flue ashes.

2. The process of preparing highly active carbon which comprises the step of separating the ashes, particularly the flue ashes from lignite (brown coal) into several fractions of different grain sizes by sifting the residues by means of sieves and the further step of purifying in known manner each of the fractions so obtained.

3. The process of preparing highly active carbon which comprises the step of separating the ashes, particularly the flue ashes from lignite (brown coal) into several fractions of different grain sizes by sifting the residues by means of sieves and the further steps of purifying each of the fractions so obtained by a treatment with hydrochloric acid.

In testimony whereof, I affix my signature.

WILHELM THEODOR GEIS.